United States Patent
Domke et al.

(10) Patent No.: US 6,524,434 B1
(45) Date of Patent: Feb. 25, 2003

(54) TUBULAR DEVICE IN A BAGGING MACHINE

(75) Inventors: Klaus Domke, Ditzingen (DE); Herbert Stotkiewitz, Bietigheim-Bissingen (DE); Wolfgang Bloch, Mu ehlacker (DE); Frank Kurz, Pliezhausen (DE); Alexander Lutz, Neubulach (DE); Hans Schaefer, Filderstadt (DE); Helmut Rumes, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,594
(22) PCT Filed: Aug. 20, 1998
(86) PCT No.: PCT/DE98/02439
§ 371 (c)(1), (2), (4) Date: Sep. 25, 2000
(87) PCT Pub. No.: WO99/16609
PCT Pub. Date: Apr. 8, 1999

(30) Foreign Application Priority Data

Sep. 30, 1997 (DE) .......................................... 197 43 158

(51) Int. Cl.⁷ .................................................. B65B 9/10
(52) U.S. Cl. ................. 156/380.1; 156/218; 156/308.4; 156/544; 493/193; 493/190; 493/267; 53/451
(58) Field of Search ................................ 493/193, 190, 493/267; 53/451; 156/218, 292, 308.4, 380.1, 583.1, 544

(56) References Cited

U.S. PATENT DOCUMENTS

| | | | | |
|---|---|---|---|---|
| 2,563,278 A | * | 8/1951 | Rummel et al. | 426/393 |
| 2,953,976 A | * | 9/1960 | Hahn | 49/31 |
| 3,303,629 A | * | 2/1967 | Tobin | 53/562 |
| 5,794,406 A | * | 8/1998 | Reichental et al. | 53/410 |

FOREIGN PATENT DOCUMENTS

| | | | |
|---|---|---|---|
| DE | 12 15 351 | * | 4/1964 |
| DE | 1 914 960 | * | 10/1969 |
| DE | 76 04 204 | * | 2/1976 |
| FR | 1 265 312 | * | 10/1961 |
| FR | 2.092.298 | * | 1/1971 |
| FR | 2 356 493 | * | 1/1978 |
| GB | 754936 | * | 8/1956 |
| GB | 882740 | * | 11/1961 |

* cited by examiner

Primary Examiner—Linda Gray
(74) Attorney, Agent, or Firm—Ronald E. Greigg

(57) ABSTRACT

A tube-forming apparatus in a bag-forming, filling, and sealing machine has a longitudinal seam heat-sealing device for connecting edge regions of the packing material belt that are placed against each other inside surface to inside surface. In order to achieve a sufficient sealing temperature in a short time, a heating body that is embodied in a lamella-like fashion protrudes like a tongue between the edge regions. In order to aid the heating body, similar heating bodies rest against the outside of the edge regions. The heating bodies have a U-shaped electric resistance wire with elongated legs which is embedded in a longitudinally folded casing made of a thin, temperature-proof woven cloth.

8 Claims, 1 Drawing Sheet

TUBULAR DEVICE IN A BAGGING MACHINE

PRIOR ART

The invention is based on a tube-forming apparatus in a bag-forming, filling, and sealing machine. In known tube-forming apparatuses of this type, the superposed edge regions of the packing material band are heated by heating belts, jaws, or rollers resting against their outsides, wherein the heat transmitted penetrates through the outer layer into the inner layer. By virtue of the fact that in order to transmit heat into the inner layer, the outer layer must also be heated, a high heating capacity is required on the one hand and a long heating time is required on the other. This is particularly disadvantageous in relatively thick, multi-layer packing materials. For this case, endless heating belts must have a reasonably large contact section, which is accompanied by the disadvantage that the returning part of the belt cools and therefore experiences heat stresses or must also be unnecessarily heated. Heating rollers are not considered since the necessary heat quantity cannot be transmitted in the narrow contact area.

ADVANTAGES OF THE INVENTION

The tube-forming apparatus according to the invention has the advantage that with direct transmission of the heat to the inside of the edge regions of the packing material band to be sealed, the heating capacity of the heating body is low and therefore the contact area is relatively small. If the outside of the edge regions of the packing material belt is also heated, this produces a particularly short structural length of the longitudinal seam sealing device.

BRIEF DESCRIPTION OF THE DRAWING

An exemplary embodiment of the invention is shown in the drawing and will be described in detail below.

DESCRIPTION OF THE EXEMPLARY EMBODIMENT

Figure 1:
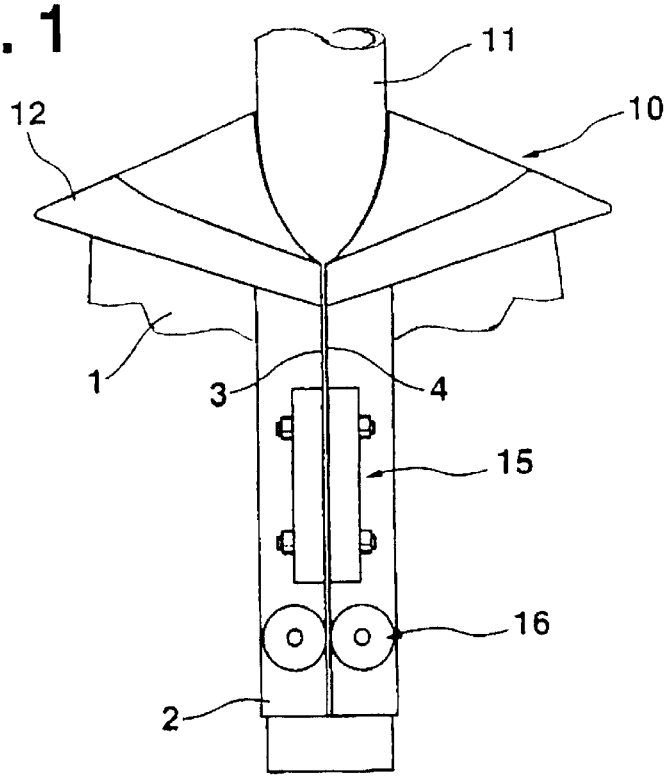
FIG. 1 is a simplified front view of a tube-forming apparatus in a bag-forming, filling, and sealing machine.

A bag-forming, filling, and sealing machine has a forming device 10 in which an incoming flat packing material belt 1 is formed into a tube 2 and its two edge regions 3, 4 protruding from the tube 2 are guided against each other inside to inside and are heat sealed to each other.

A forming tube 11 and a forming shoulder 12 that encompasses the forming tube with an annular gap are used to form the tube 2; the flat packing material belt 1 slides over the forming tube and forming shoulder and when it enters the annular gap around the forming tube 11, it is formed into the tube 2.

The two edge regions 3, 4, which are placed against each other and belong to a packing material belt 1, having a heat-sealable inner layer, when passing through a longitudinal seam heat-sealing device 15 associated with the forming tube 11, are heated to the melting temperature of the inner layer and are then pressed together by a pair of press rollers 16 so that the two inner layers of the edge regions 3, 4 melt together in the heated region or at least undergo a firm adhesion.

The longitudinal seam sealing device 15 has a heating body 20 in the form of a thin lamella, which protrudes like a tongue between the two edge regions 3, 4 of the packing material belt 1 that are guided against each other. The heating body 20 has an electric resistance wire 18 bent into a U-shape, with two closely adjacent elongated legs 22, 23. The two legs 22, 23 are embedded in a casing 24, which is comprised of a longitudinally folded strip 25 made of a thin woven cloth of a heat-resistant, low friction material such as Teflon fiberglass. In the folded strip 25, the two legs 22, 23 of the resistance wire 21 are disposed close to the fold 26, which extends close to and parallel to the forming tube 11 when the heating body 20 is completely installed. The superposed layers of the casing 24, which are glued to each other by means of a temperature-proof adhesive, are mounted between two support strips 27, 28 which are held together by means of nuts 30 and bolts 29 which are also used to mount the longitudinal seam sealing device 15. The two ends of the resistance wire 21 protruding from the casing 24 are connected by means of connecting clamps 31, 32 to conductors 33, 34 that lead to a power source. Preferably, the power source, not shown, is a transformer with a voltage of 4 to 12 volts and a current intensity of 6 to 12 amps. During operation of the device, the electrical output is adjusted and regulated so that the inside of the two edge regions 3, 4 of the continuously advanced tube 2 or of the packing material belt 1 touch the outside of the lamella-like heating body 20, are heated to melting temperature before they leave the heating body 20, are pressed together by the pressing rollers 16, and are cooled so that a definite melting or adhesion of the longitudinal seam is produced.

Figure 2:
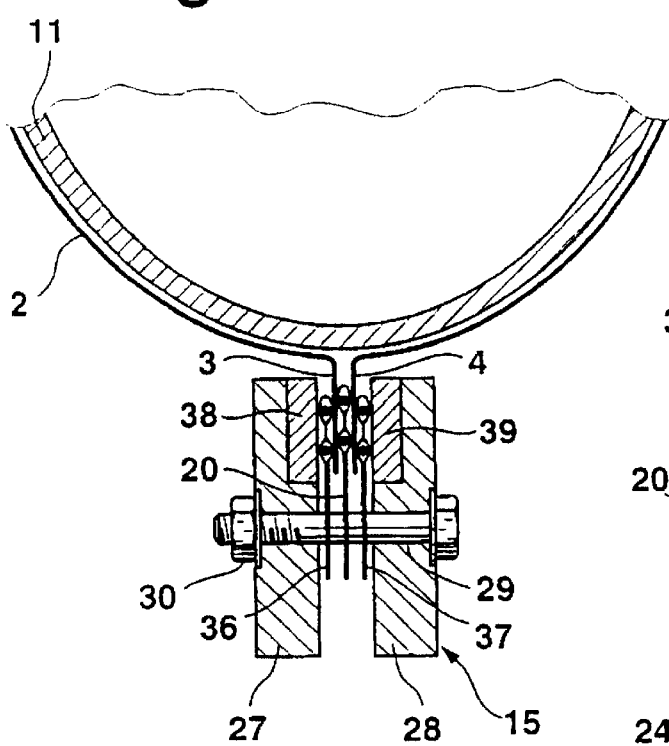
FIG. 2 is a cross section through a heat-sealing device of the tube-forming apparatus according to FIG. 1.

In order to accelerate the heating of the edge regions 3, 4 of the packing material belt 1, which is necessary for a high yield of the bag-forming, filling, and sealing machine, in the embodiment according to FIG. 2, two similar heating bodies 36, 37 are also disposed, which touch the outside of the edge regions 3, 4 of the packing material belt 1. These two heating bodies 36, 37 are disposed on both sides of the first heating body 20 and are attached along with it in the support strips 27, 28. Their wall regions covering the resistance wire 21 close to the fold 26 rest against an elastic insert 38, 39 in the support strips 27, 28. Like the main heating body 20, the additional heating bodies 36, 37 are connected to a power source that can be regulated. They heat the edge regions 3, 4 of the packing material belt 1 with an output that is adjusted so that a temperature is achieved in the outer layer of the edge regions 3, 4 of the packing material belt so that a rapid heating of the inner layer is encouraged.

Figure 3:
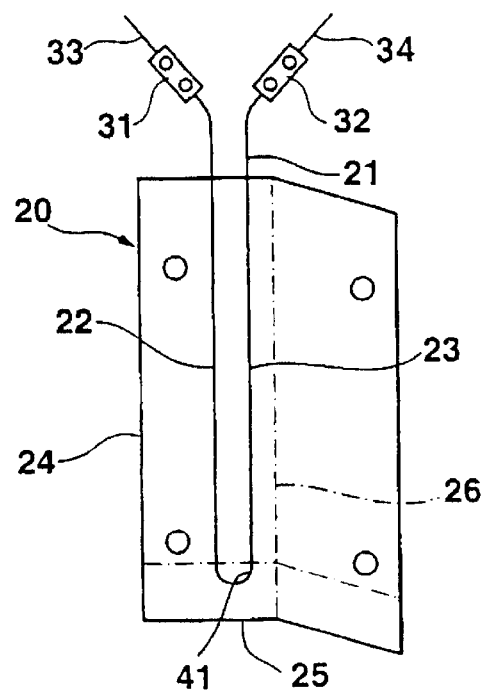
FIG. 3 is a side view of a heating body of the heat-sealing device.

Preferably, the heating bodies 20; 36, 37 are mounted in the support strips 27, 28 so that the arc-shaped bottom of the resistance wire 21 of the two heating bodies 36, 37 contacting the outside rests against the inlet end and the arc-shaped bottom of the resistance wire 21 of the inner heating body 20 rests against the outlet of the longitudinal seam sealing device 15. The arc-shaped bottom 41 of the resistance wire 21 of the inner heating body 20 can also be uncovered by the casing 24, as indicated with dot-and-dash lines in FIG. 3.

The foregoing relates to a preferred exemplary embodiment of the invention, it being understood that other variants and embodiments thereof are possible within the spirit and scope of the invention, the latter being defined by the appended claims.

What is claimed is:

1. A tube-forming apparatus in a bag-forming, fifting, and sealing machine, comprising a device in which a packing material belt (1) with a heat-sealing layer on an inside is formed into a tube (2), wherein edge regions (3, 4) of the packing material belt (1) are placed inside to inside, having a longitudinal seam heat-sealing device (15) with a heating body (20) that has an electrical resistance wire (21) and heats the edge regions (3, 4) of the continuously advanced packing material belt (1), and a pressing device (16), said pressing device presses the heated edge regions (3, 4) together and cools them, the resistance wire (21) of the heating body (20) is disposed in a U shape with closely adjoining legs (22, 23) between two thin, heat-resistance strips (24) that have a low coefficient of friction, and that the heating body (20) is associated with the tube-forming apparatus (10) in such a way that the edge regions (3, 4) of the packing material band (1) to be sealed against one another rest in a sliding fashion with their insides against the heating body (20) that protrudes between them during the advancing motion of the packing material belt (1).

2. The tube-forming apparatus according to claim 1, in which a heating body (36, 37) having an electrical resistance wire (21) is disposed on each of the two sides of the heating body (20) and that these heating bodies (36, 37) each touch an outside surface of an edge region (3, 4) of the packing material belt (1).

3. The tube-forming apparatus according to claim 1, in which the resistance wire (21) of the heating body (20) is embedded in a longitudinally folded arc made of a thin, temperature-proof woven cloth.

4. The tube-forming apparatus according to claim 2, in which the resistance wire (21) of each of the heating bodies (20; 36, 37) is embedded in a longitudinally folded arc made of a thin, temperature-proof woven cloth.

5. A tube-forming apparatus according to claim 1, in which the heating body (20) is attached between two support strips (27, 28).

6. A tube-forming apparatus according to claim 2, in which the heating bodies (20; 36, 37) are attached between two support strips (27, 28).

7. A tube-forming apparatus according to claim 3, in which the heating body (20) is attached between two support strips (27, 28).

8. A tube-forming apparatus according to claim 4, in which the heating bodies (20; 36, 37) are attached between two support strips (27, 28).

* * * * *